No. 732,823. PATENTED JULY 7, 1903.
M. H. BRANIN.
ADJUSTABLE VACUUM TUBE.
APPLICATION FILED MAR. 8, 1898.
NO MODEL.
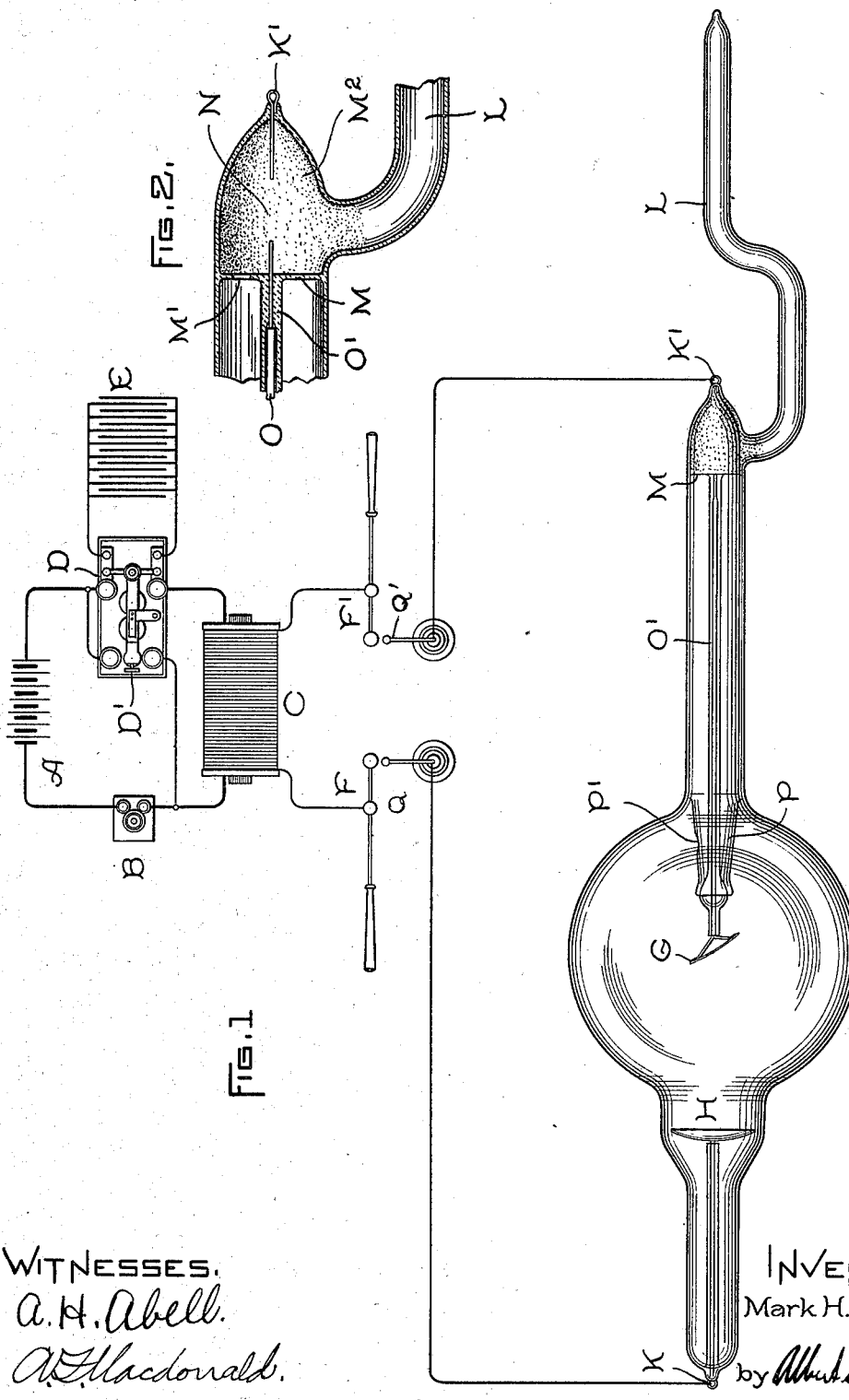
WITNESSES.
A. H. Abell.
A. F. Macdonald.
INVENTOR.
Mark H. Branin,
by Albert G. Davis.
Atty.

No. 732,823.

Patented July 7, 1903.

UNITED STATES PATENT OFFICE.

MARK H. BRANIN, OF NEWARK, NEW JERSEY, ASSIGNOR TO THE GENERAL ELECTRIC COMPANY, A CORPORATION OF NEW YORK.

ADJUSTABLE VACUUM-TUBE.

SPECIFICATION forming part of Letters Patent No. 732,823, dated July 7, 1903.

Application filed March 8, 1898. Serial No. 673,128. (No model.)

*To all whom it may concern:*

Be it known that I, MARK H. BRANIN, a citizen of the United States, residing at Newark, in the county of Essex, State of New Jersey, have invented certain new and useful Improvements in Adjustable Vacuum-Tubes, of which the following is a specification.

My invention relates to vacuum-tubes, and is particularly useful in connection with that class of tubes which are used for the production of X-rays.

It is well known that in all vacuum-tubes the vacuum tends to rise after a long-continued use of the tube and to vary to a certain extent with changes in the temperature of the tube and for other reasons.

It is the object of my invention to provide means whereby the vacuum may be controlled and regulated and automatically maintained at any desired point.

To this end my invention consists in liberating a gas or vapor in the tube or otherwise lowering the vacuum by the action of the current flowing through the tube. I prefer to accomplish this result by placing at any desired point in the tube—as, for example, at one end—a chemical substance capable of giving off gas or vapor, as is well understood in the art, and causing the current which flows through the tube to act upon the chemical—as, for example, by passing through a spark-gap in proximity to the said chemical—and thus to liberate gas and reduce the vacuum.

Referring to the accompanying drawings, Figure 1 illustrates a particular form of apparatus embodying my invention, while Fig. 2 is a sectional view, on an enlarged scale, of a portion of the tube shown in Fig. 1.

A is a source of current—as, for example, a primary or storage battery.

B is a rheostat.

C is an induction-coil, and D is a rheotome or vibrator of any well-known construction provided with a regulating-screw D', which serves to adjust the frequency of the breaks. A condenser E is shunted around the spark-gap, as is usual in such devices, and the secondary winding of the coil is connected to two adjustable terminals F F'.

The apparatus thus far described is so well known in the art that further explanation is unnecessary.

The particular form of the tube illustrated is a single-focus tube, provided with an anode G and a cathode H and with two terminals K K' sealed into the glass. The usual exhaust-tube L is attached to one end. I place a partition M, provided with an opening M', at one end of the tube, as shown, and place in the space thus formed some suitable chemical $M^2$—as, for example, potassium hydrate.

The anode G is connected with the terminal K' by means of a wire, serving as a tube-conductor, and a spark-gap N is formed in this wire in such relation to the chemical that the discharge passing through the spark-gap will act upon the chemical and cause it to liberate vapor. The anode is shown as fastened to a support O, connected to the leading-in wire or tube-conductor and mounted in a glass tube O', fastened to the partition-wall M.

A support P in the form of a frustum of a cone is fastened to the wall of the tube and to a bulb formed in the glass tube O', as shown, to form a mechanical support for the anode. An opening P' is formed in the wall of the support P to allow gas to pass from the chemical to the body of the tube.

I find by experiment that if the voltage and frequency of the current passing through the tube be properly adjusted vapor will be liberated from the chemical at such a rate as to automatically maintain the desired vacuum in the tube continuously through any desired portion of time. If it is desired to vary the vacuum, such variation may be secured by a proper manipulation of the resistance B, which varies the primary current, or of the screw D', which varies the frequency and the voltage of the secondary current, or by a suitable adjustment of the spark-gaps formed between the terminals F F' and the standards Q Q'.

It will be seen that the spark-gap which causes the regulation is placed in the tube itself, which makes the apparatus exceedingly self-contained and simple and is in series with the current flowing through the tube.

What I claim as new, and desire to secure by Letters Patent of the United States, is—

1. The combination with a Roentgen-ray tube, of a chemical substance placed therein, and a spark-gap in proximity to the substance and in series with the tube.

2. The combination with a Roentgen-ray tube, of a chemical substance placed therein, a spark-gap in proximity to the substance and in series with the tube, and means for varying the current flowing through the spark-gap.

3. The combination with a Roentgen-ray tube, of means for producing heat locally within the tube, consisting of a spark-gap arranged within the tube and in series with the main circuit of the tube.

In witness whereof I have hereunto set my hand this 4th day of March, 1898.

MARK H. BRANIN.

Witnesses:
WM. H. MEADOWCROFT,
CHAS. H. HEELEY.